United States Patent [19]

Hutyra

[11] Patent Number: 4,815,638

[45] Date of Patent: Mar. 28, 1989

[54] MOPED CARRIER

[76] Inventor: Freddie F. Hutyra, 201 Norma, Waco, Tex. 76705

[21] Appl. No.: 86,642

[22] Filed: Aug. 18, 1987

[51] Int. Cl.$^4$ ............................................... B60R 9/10
[52] U.S. Cl. ........................... 224/42.03 B; 224/42.07; 414/462
[58] Field of Search ................. 224/42.03 B, 42.03 R, 224/42.07, 42.45; 414/462

[56] References Cited

U.S. PATENT DOCUMENTS

| | | | |
|---|---|---|---|
| 3,207,396 | 9/1965 | Mundell et al. | 224/42.03 B |
| 3,367,548 | 2/1968 | Cooper | 224/42.03 B |
| 3,720,333 | 3/1973 | Vaughn | 224/42.03 B X |
| 3,891,132 | 6/1975 | Chandler | 224/42.03 B |
| 4,048,736 | 4/1978 | Jacobs, Jr. | 224/42.03 B |
| 4,189,274 | 2/1980 | Shaffer | 224/42.03 B X |
| 4,318,501 | 3/1982 | Graber | 224/42.03 R |

Primary Examiner—Werner H. Schroeder
Attorney, Agent, or Firm—Kenneth D. Baugh

[57] ABSTRACT

The invention relates to a moped carrier 10. The moped carrier 10 is mounted to a bumper 16 of a recreational vehicle 12 and is provided to support a pair of mopeds 110. The mopeds 110 each have front and rear wheels 114 and 116 respectively. The moped carrier 10 includes a plurality of spaced support members 24 and 40 coupled to the bumper 16. Tracks assemblies 46 are provided which are transversely coupled to the support members 24 and 40 for maintaining and supporting the wheels 114 and 116 of the mopeds 110 in an upright position. The moped carrier 10 also includes vertically extending members 72, having horizontal supports 74, coupled to the bumper 16 for lockingly engaging the moped handle bar 118 and thereby securing the mopeds 110 adjacent to the rear of the recreational vehicle 12.

9 Claims, 3 Drawing Sheets

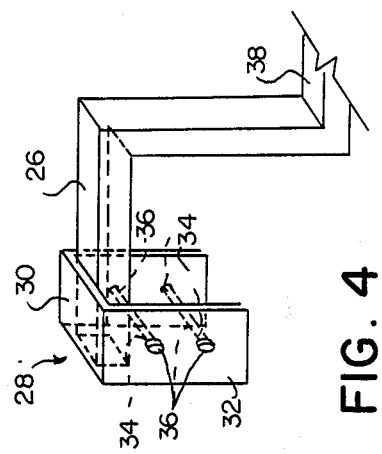
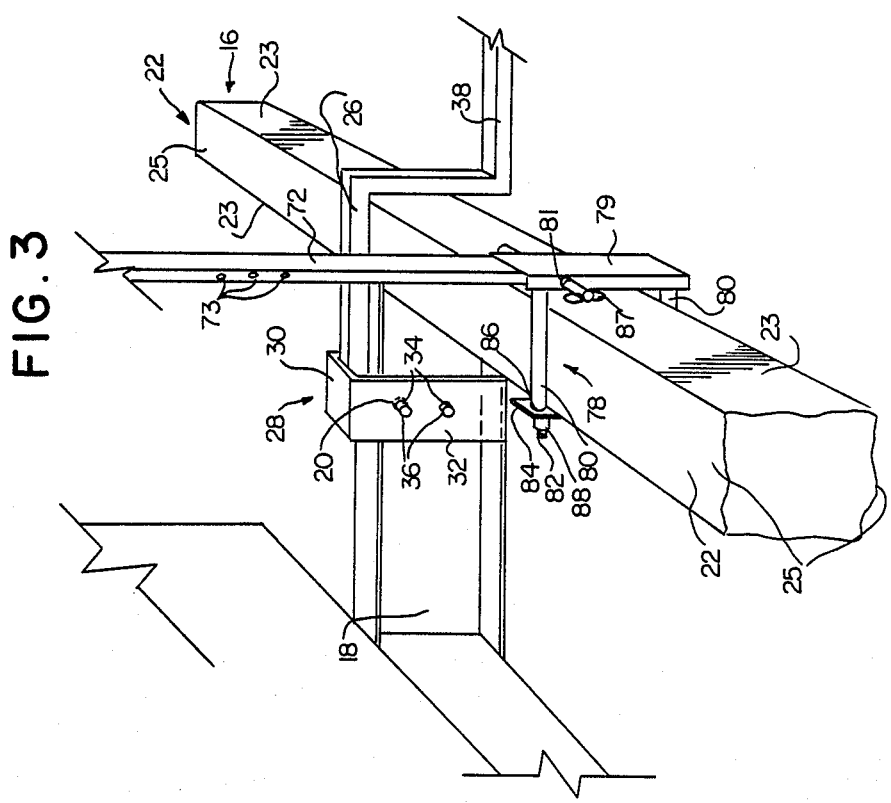

MOPED CARRIER

TECHNICAL FIELD

This invention relates to a vehicle mounted carried and more particularly a carrier for transporting mopeds on recreational vehicles. For many years motorcycles and other two wheeled vehicles such as mopeds have been a popular recreational tool. This popularity has resulted in the creation of a number of sports for such vehicles. Because of the popularity of the vehicles it is necessary to transport them to designated areas where activities designed for them are being conducted. Frequently participants have to travel distances that make travel in a recreational vehicle feasible because of the comfort afforded by such vehicles when traveling long distances. Consequently, it is desirable to provide a moped carrier that can be readily mounted to a recreational vehicle.

BACKGROUND ART

There are a number of different arrangements available today for transporting two wheeled vehicles. However, these arrangements are typically devices that are used on small vehicles such as automobiles and not larger more comfortable vehicles such as recreational vehicles. Additionally, these vehicles typically can only accomodate one two wheeled vehicle.

Such arrangements are disclosed in U.S. Pat. No. 4,189,274, U.S. Pat. No. 4,046,297 and U.S. Pat. No. 3,720,333.

Although these devices are suitable for adaptation to smaller vehicles it is desirable to provide a device that will be readily be adaptable to a larger more comfortable vehicle such as the recreational vehicle.

DISCLOSURE OF THE INVENTION

The invention relates to a moped carrier. The moped carrier in accordance with the invention is mounted to a vehicle bumber and is provided to support a plurality of mopeds, each having a frame, and front and rear wheels, adjacent the rear of the vehicle. The moped carrier includes a plurality of spaced support members coupled to first portions of the bumper. An intermediate support member is coupled to second portions of the vehicle bumper between the plurality of spaced support members. Means transversely coupled to the support members are provided for maintaining and supporting the wheels of the mopeds in an upright position. The moped carrier also includes a means coupled to second portions of the bumper for lockingly engaging portions of the moped frame so that the moped is supported and secured adjacent to the rear of the vehicle.

BRIEF DESCRIPTION OF THE DRAWING

The details of the invention will be described in connection with the accompanying drawing in which:

FIG. 3 is an enlarged cross-sectional view taken along lines 3—3 in FIG. 2.

FIG. 4 is an exposed view of portions of the moped carrier illustrated in FIG. 3.

BEST MODE FOR CARRYING OUT THE INVENTION

Figure 1:
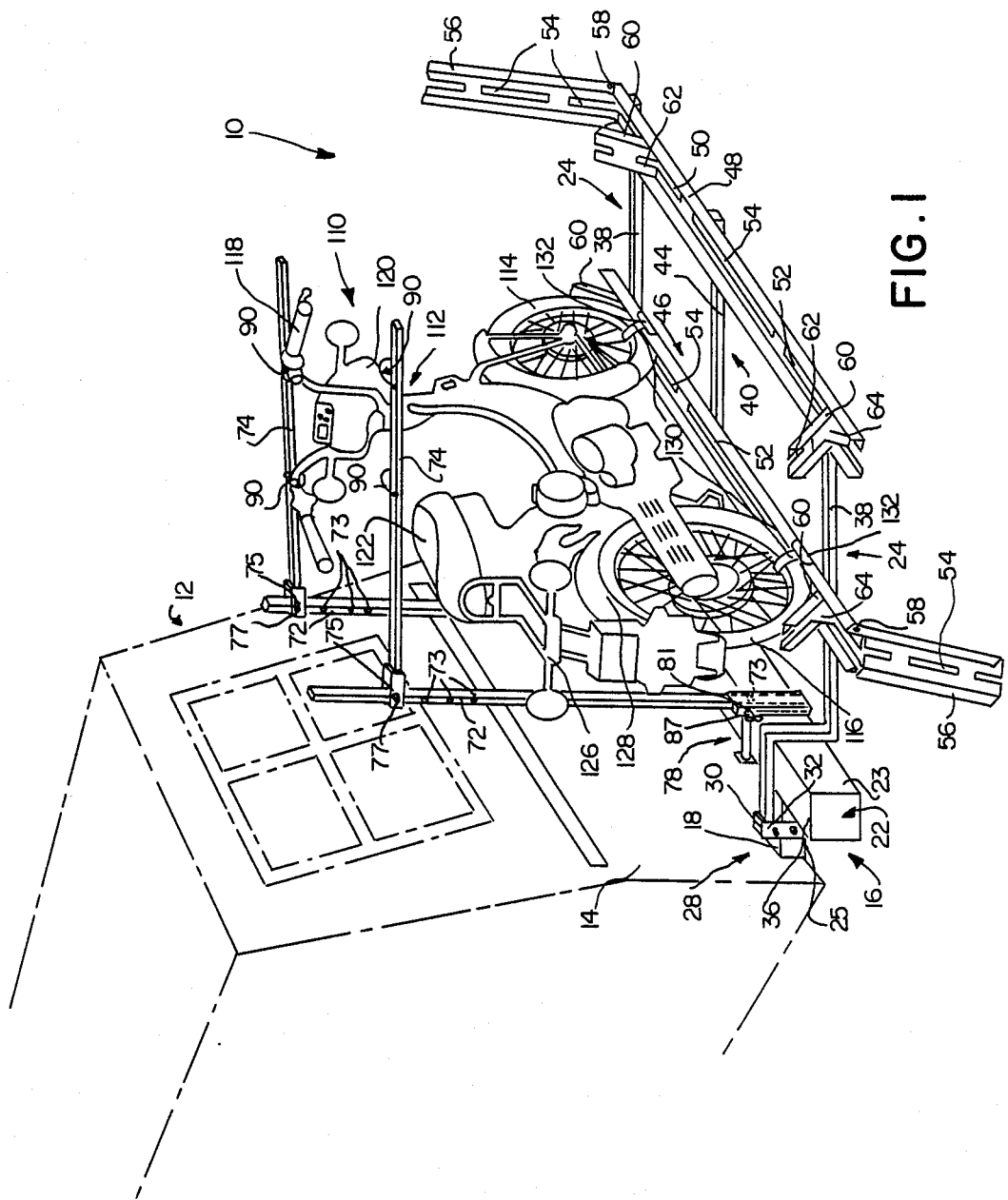
FIG. 1 is a prospective view illustrating a moped carrier in accordance with the principles of the invention.
Figure 2:
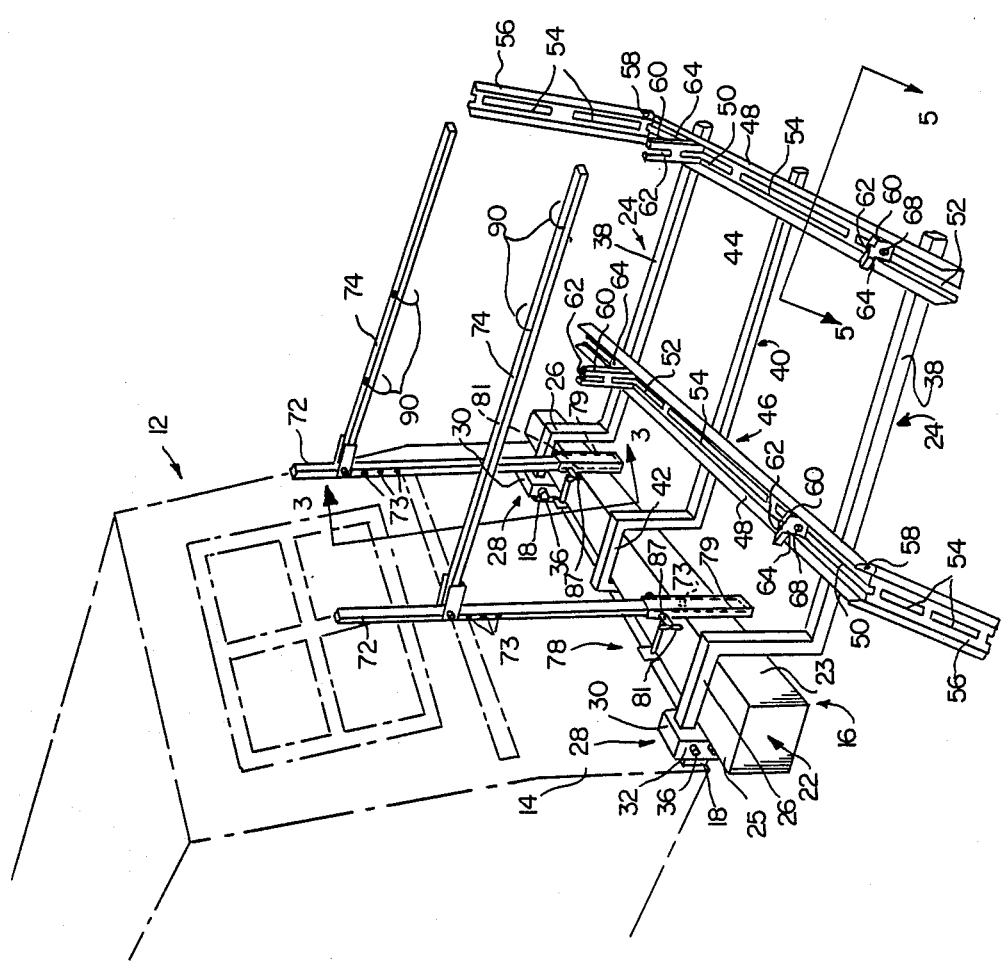
FIG. 2 is another prospective view illustrating a moped carrier in accordance with the principles of the invention.

As illustrated in FIGS. 1 and 2, a moped carrier generally designated by the numeral 10 is provided to be coupled to a recreational vehicle generally designated by the numeral 12. The moped carrier 10 is coupled to a rear portion 14 of the vehicle 12 on a rear bumper generally designated by the numeral 16. The rear bumper 16 of the recreational vehicle 12 is provided with a pair of spaced rectangularly shaped bumper members 18 (only one shown in FIG. 1 and 2) having apertures 20 (FIG. 3) formed therein which are coupled to and extend longitudinally from the rear 14 of the recreational vehicle. The bumper 16 also includes a rectangularly shaped bumper bar generally designated by the numeral 22 having front and rear surfaces 23 and top and bottom surfaces 25. The bumper bar 22 is coupled to the members 18 so that it is parallel to the rear 14 of the recreational vehicle. The bumper 16 is a well known bumper structure currently being used on recreational vehicles.

Referring specifically to FIG. 2, the moped carrier 10 is provided with a pair of spaced longitudinally extending support members generally designated by the numeral 24. Each support member 24 includes an L-shaped engaging member 26 which engages adjacent top and front surfaces 23 and 25 of the bumper bar 22. The support members 24 also include a U-shaped coupler, generally designated by the numeral 28 (FIG. 4) coupled to one end of the L-shaped engaging member 26. The U-shaped coupler 28 includes a pair of spaced coupling arms 32 which are coupled to a planar member 30. The coupling arms 32 are provided with spaced aligned apertures 34 which are provided to receive coupling pins or bolts 36. The support members 24 also include a longitudinally extending arm 38 coupled to the other end of the L-shaped engaging member 26.

The support members 24 are aligned on the bumper bar 22 so that the apertures 34 in the U-shaped couplers 28 are aligned with adjacent apertures 20 in the bumper member 18 thereby permitting coupling by the bolts 36.

An intermediate longitudinally extending support member, generally designated by the numeral 40, is aligned between the support members 24. The support member 40 includes a U-shaped engaging member 42 which engages adjacent portions of the bumper bar 22. The support member 40 also includes a longitudinally extending arm 44 which is aligned with the arms 38 of the support members 24.

Figure 5:
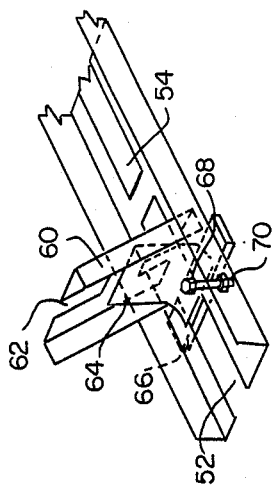
FIG. 5 is a cross-sectional view taken along lines 5—5 in FIG. 2.

The moped carrier 10 also includes a pair of spaced track assemblies, generally designated by the numeral 46, which are coupled to extend across the support members 24 and 40. The track assemblies 46 each include a stationary track 48 having rectangular shaped groves 50, 52 and 54 formed therein. The track assemblies 46 also include a movable track 56 pivotably coupled to the stationary track 48 by pins 58. The movable track 56 also has grooves 54 formed therein. Upstanding wheel supports, generally designated by the numeral 60, are slidably mounted in each groove 50 and 52, respectively, of the stationary track 48. The upstanding wheel support members 60 are provided with grooves 62. One of the upstanding wheel support members 60 on each stationary track 48 is removably mounted in the adjacent groove 50 as illustrated in FIG. 5. As shown the upstanding wheel support member 60 includes a rear support 64 which is coupled to a plate 66 mounted below the track 52 by a bolt 68 and nut 70. This arrangement allows the movable mounting of the upstanding wheel support members 60.

A pair of vertically extending members 72 having apertures 73 formed therein are provided. The members 72 each support horizontal support bars 74 at one end thereof. The horizontal support bars 74 each include an aperture 76 and pin 77. The horizontal support bars 74 are coupled at a desired height on the respective, vertically extending member 72. This is accomplished by aligning the aperture 76 with the appropriate aperture 73 and inserting the pin 77 through the aligned apertures. A coupling member, generally designated by the numeral 78, (FIG. 3) is provided at a lower end of the vertically extending members 72. The coupling member 78 includes a hollow rectangular member 79 and a pair of spaced horizontally extending coupling bars 80 coupled thereto. The coupling bars 80 which have threaded ends 82 are aligned on the bumper bar 82 so that one bar engages the top surface 25 and the other bar engages the bottom surface 25 of the bumper bar. The rectangular members 79 are each provided with an aperture 81 and has a diameter slightly larger than the vertically extending members 72. The rectangular members 79 are aligned to engage an adjacent portion of the front surface 23 of the bumper bar 22.

A coupling plate 84 is provided having apertures 86 formed therein. The coupling plate 84 is aligned to engage adjacent portions of the rear surface 23 of the bumper bar 22. The coupling bars 80 extend through the apertures 86 in the plate 82 to permit coupling to the bumper bar 22 by first and second couplers or bolts 88 screwed on the ends 82 of the coupling bars. Coupling pins 87 are provided to couple the vertically extending members 72 in the rectangular member 79. This is accomplished by inserting the pin 87 through the aligned apertures 73 and 81.

The horizontal support bars 74 are each provided with a plurality of hooks 90 which engage adjacent portions of a moped 110. The moped carrier 10 may be constructed of a lightweight sturdy material such as, for example, a hard plastic.

The moped carrier 10 is provided to carry a pair of two wheeled vehicles, such as, for example, the moped 110 illustrated in FIG. 1. The moped 110 includes a frame generally designated by the numeral 112 have front and rear wheels 114 and 116 respectively. A handle bar 118 is provided on an uppermost portion 120 of the frame 112 above the front wheel 114. A seat 122 for a driver (not shown) is coupled to an intermediate portion 124 of the frame 112. A luggage rack 126 is coupled to extend from the seat 122 above the rear wheel 116 to a rear portion 128 of frame 112.

When it is desired to secure the moped 110 on the carrier 10 the movable track 56 of the track assembly 46 is pivoted downward as illustrated in FIGS. 1 and 2. The moped 110 is then rolled onto the track assembly 46. The grooves 50, 52 and 54 in the track assembly help to properly position and retain the wheels 114 and 116 on the stationary track 48 of the track assembly. Once the moped 110 is positioned in the stationary track 48 the hooks 90 are coupled to adjacent portions of the handle bar 118. This secures the front and uppermost portion 120 of the frame 112 to the horizontal support bar 74. A retaining strap 130 having a coupling assembly 132 is then secured around each wheel 114 and 116 and adjacent portions of the stationary track 48. This further secures the moped 110 on the stationary track 48.

Another moped 110 (not shown) can be moved onto the other track assembly 46 on the movable track 56 of the other track assembly. When the second moped 110 is on the carrier 10 the front of the second moped will be adjacent to the rear of the first moped 110. The second moped 110 is then secured at the handle bars 118 by hooks 90 and coupled to the stationary track 48 by retaining straps 130.

The moped carrier 10 can be easily disassembled and removed from the recreational vehicle 12. When it is desired to remove the moped carrier 10 from the recreational vehicle 12 the U-shaped couplers 28 are removed from the bumper member 18. This permits the support members 24 and 40 and the track assemblies 46 coupled thereto to be lifted off the bumper 16. The horizontal support bars 74 can be removed from the vertically extending members 72 by removing the pins 77 from the apertures 75 and 73. The vertically extending members 72 can then be removed from rectangular members 79 by removing the pins 87. If desired however, the entire coupling member 78 which supports the vertically extending members 72 may be removed. The moped carrier 10 can be easily mounting to and dismounted from the recreational vehicle 12.

It should be understood that various changes and modifications can be made without departing from the spirit and scope of the invention as defined in the following claims.

What is claimed is:

1. A moped carrier mounted to a vehicle bumper which includes a pair of spaced longitudinally extending bumper members with apertures formed there through coupled to the vehicle and a bumper bar coupled to the longitudinally extending members, for supporting first and second mopeds, having a frame and front and rear wheels, adjacent to the rear of the vehicle including:

a plurality of spaced support members, each one of the plurality of spaced support members including an engaging member having first portions aligned adjacent to and in engagement with a front surface of the bumper bar and second portions aligned adjacent to and in engagement with a top surface of the bumper bar;

a coupling member, coupled to one end of the second portions of the engaging member, and having apertures formed therein, aligned in engagement with one of the pair of spaced longitudinally extending bumper members so that the apertures formed therein are aligned with the apertures in the coupling members; and a coupling pin for insertion into each one of the aligned apertures so that the support member is coupled to the adjacent longitudinally extending bumper member.

an intermediate support member coupled to second portions of the bumper between the plurality of spaced support members;

means, transversely coupled to the support members, for maintaining and supporting the wheels of the first and second mopeds in an upright position; and means, coupled to the bumper bar of the bumper, for lockingly engaging portions of the moped frames so that the mopeds are supported and secured adjacent to the rear of the vehicle.

2. A moped carrier as defined in claim 1 wherein the intermediate support member includes an engaging member, the engaging member having first portions aligned adjacent to and in engagement with a front surface of the bumper bar, second portions aligned adjacent to and in engagement with a top surface of the bumper bar and third portions aligned adjacent to and in engagement with a rear surface of the bumper bar.

3. A moped carrier as defined in claim 2 wherein the maintaining and supporting means includes:
   a first track member having a groove formed therein, transversely coupled to the support members; and
   a second track member, having a groove formed therein, transversely coupled to the support members in spaced relationship with the first track member.

4. A moped carrier as defined in claim 3 wherein the first and second track members each include:
   a stationary track having a groove formed therein;
   a first wheel support slidably mounted in the groove of the stationary track at one end thereof;
   a second wheel support slidably mounted in the groove of the stationary track at the other end thereof; and
   a movable track pivotably coupled to the stationary track at one end thereof, the movable track being pivotable to a predetermined position so that the moped can be moved onto the stationary track.

5. A moped carrier as defined in claim 4 wherein the lockingly engaging means includes:
   a first vertically extending member, having apertures formed therein, coupled to the bumper bar;
   a second vertically extending member, having apertures formed therein, coupled to the bumper bar in spaced relationship to the first vertically extending member;
   a first horizontal support bar, having apertures formed therein, the first horizontal support bar being aligned with the first vertically extending member so that the apertures formed therein can be aligned with a selected one of the apertures in the first vertically extending member;
   a first coupling pin for insertion into the aligned apertures to couple the first horizontal support bar to the first vertically extending member;
   a second horizontal support bar having apertures formed therein, the second horizontal support bar being aligned with the second vertically extending member so that the apertures formed therein can be aligned with a selected one of the apertures in the second vertically extending member; and
   a second coupling pin for insertion into the aligned apertures to couple the second horizontal support bar to the second vertically extending member.

6. A moped carrier as defined in claim 5 wherein the first and second horizontal support bars each include a pair of engaging members for coupling to the frame of the adjacently aligned moped.

7. A moped carrier as defined in claim 6 wherein the moped carrier further includes a coupling member coupled to each one of the vertically extending members for securing the vertically extending member to the bumper bar.

8. A moped carrier as defined in claim 7 wherein the coupling member includes:
   a first coupling bar, having threads formed on one end thereof, which engages the top surface of the bumper bar;
   a second coupling bar, having threads formed on one end thereof, which engages the bottom surface of the bumper bar;
   a coupling plate, having a pair of spaced apertures formed therein, aligned adjacent to the back surface of the bumper bar so that the threaded end of the first coupling bar extends through one of the pair of apertures and the threaded end of the second coupling bar extends through the other one of the pair of apertures;
   a holding member, having an aperture formed therein, for aligning the vertically extending member therein adjacent to the front surface of the bumper bar, so that the aperture in the holding member is aligned with a selected aperture in the vertically extending member;
   a coupling pin for insertion into the aligned apertures to couple the vertically extending member in the holding member;
   a first coupler secured to the threaded end of the first coupling bar; and
   a second coupler secured to the threaded end of the second coupling bar, the first and second couplers being fastened so that the vertically extending member is tightly secured adjacent to the front surface of the bumper bar.

9. A moped carrier as defined in claim 8 further including a retaining strap for coupling each one of the moped wheels to an adjacent portion of the stationary track.

* * * * *